R. S. FEND.
AUTOMOBILE.
APPLICATION FILED MAY 5, 1915.

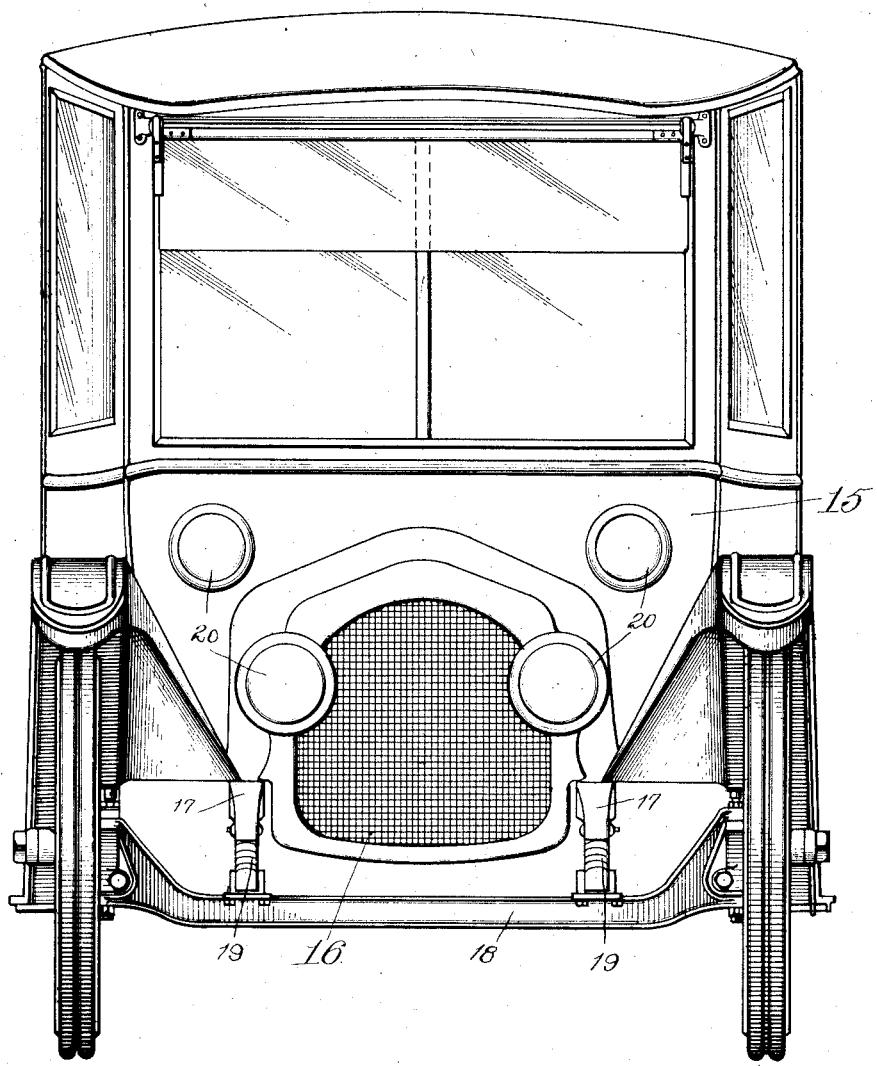

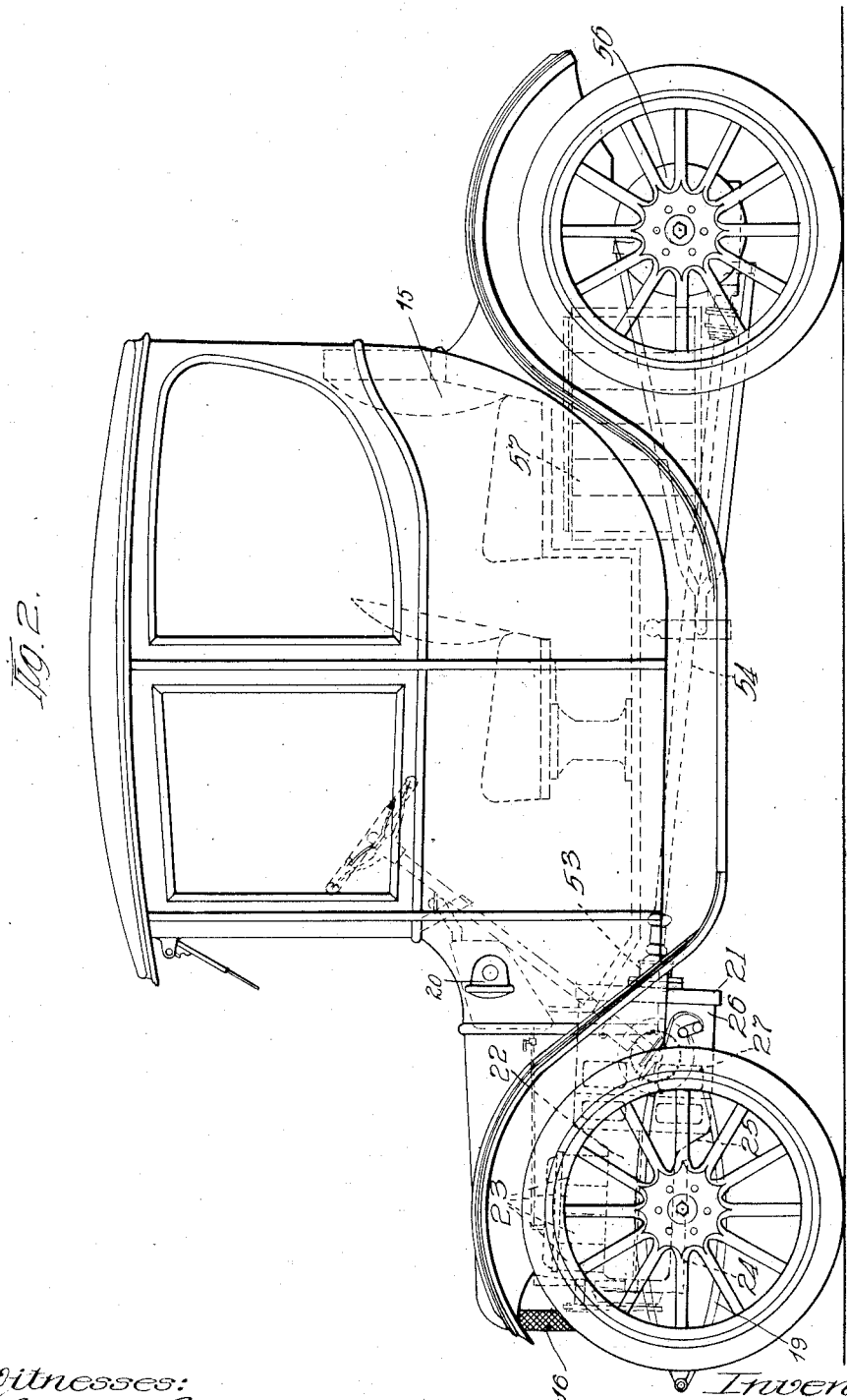

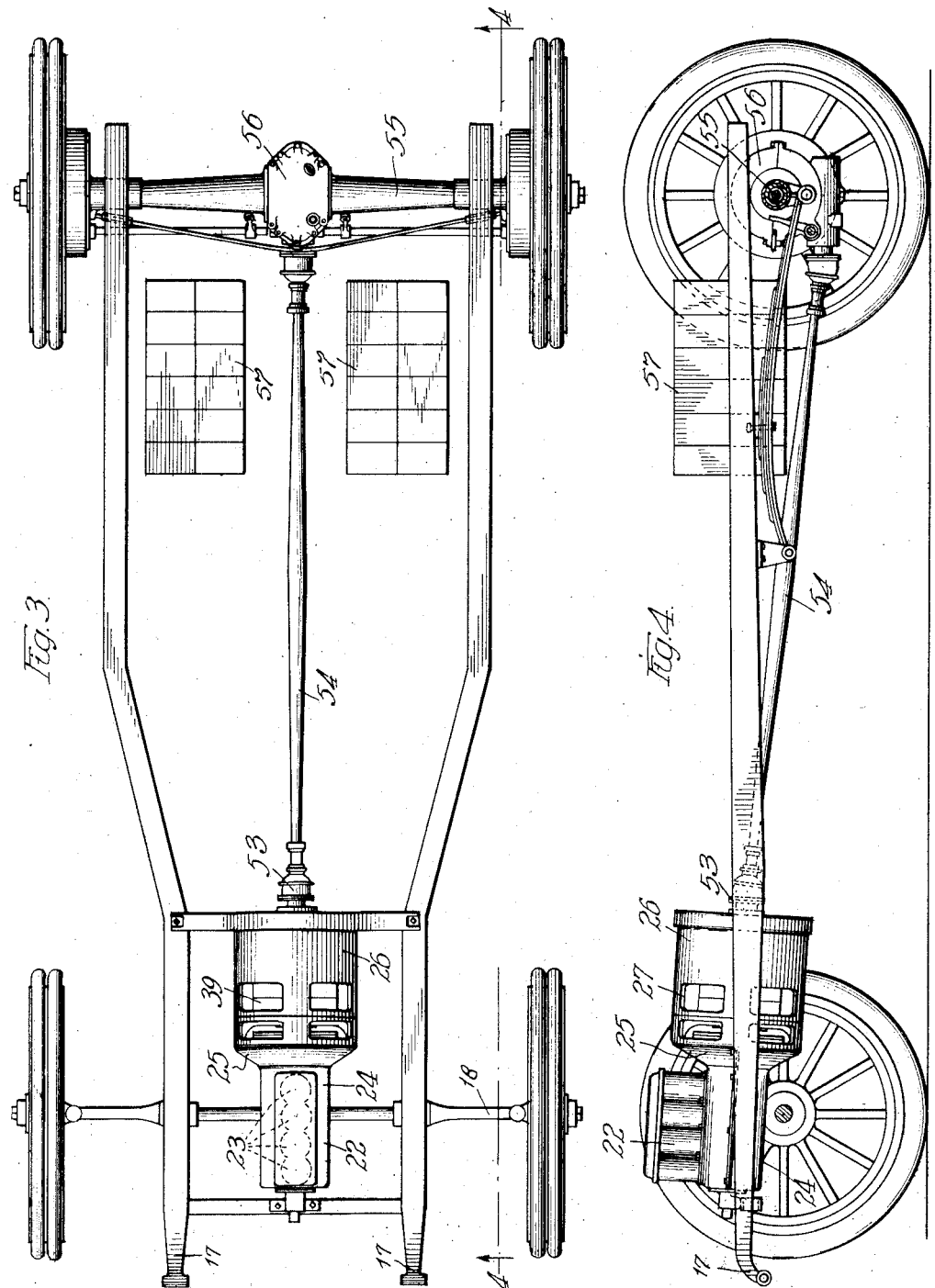

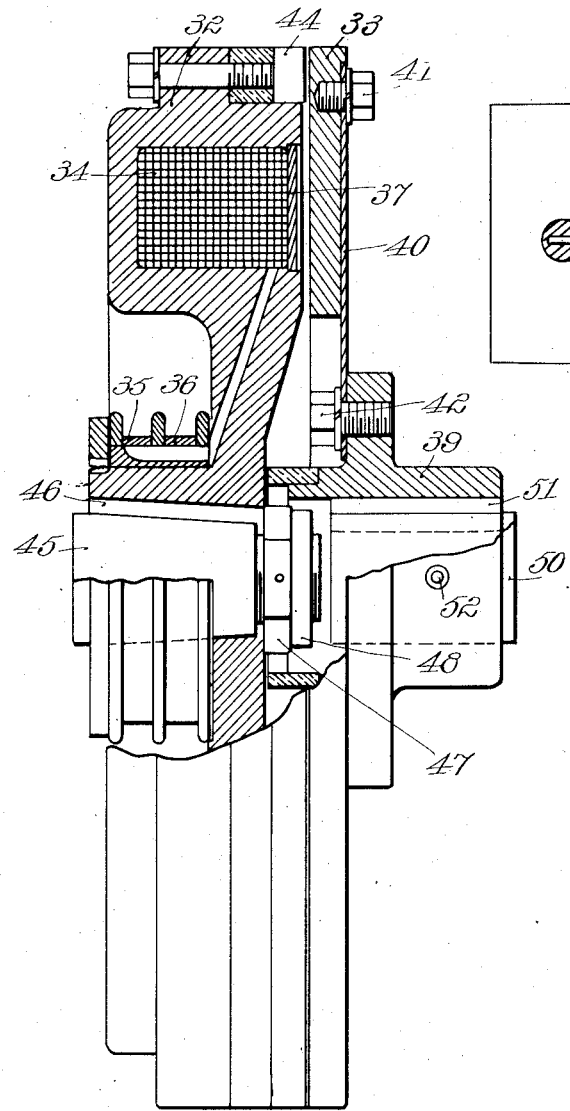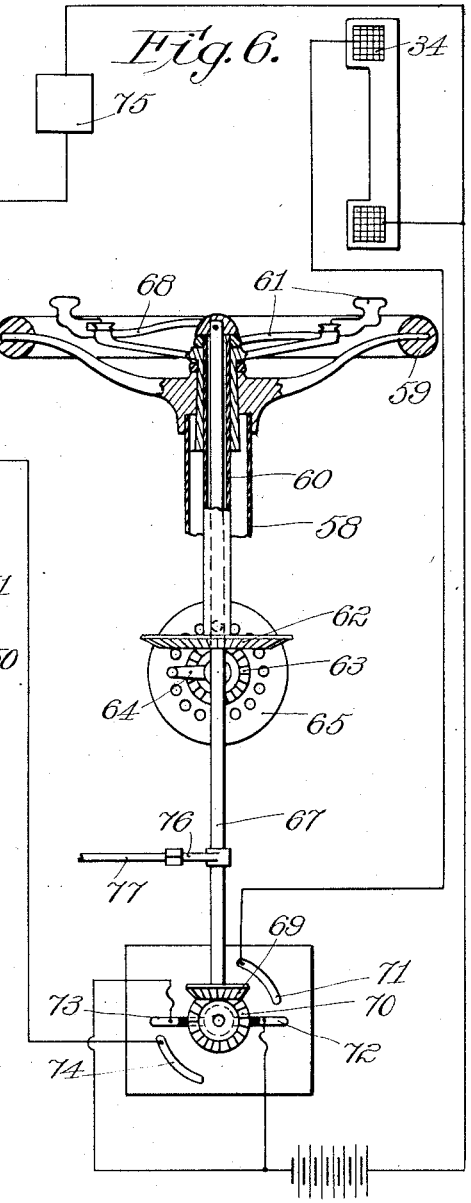

1,255,724.

Patented Feb. 5, 1918.
6 SHEETS—SHEET 5.

Witnesses:
Robert F. Brach
Albin C. Ahlberg.

Inventor
Roland S. Fend
By Williams & Bradbury
Attorneys

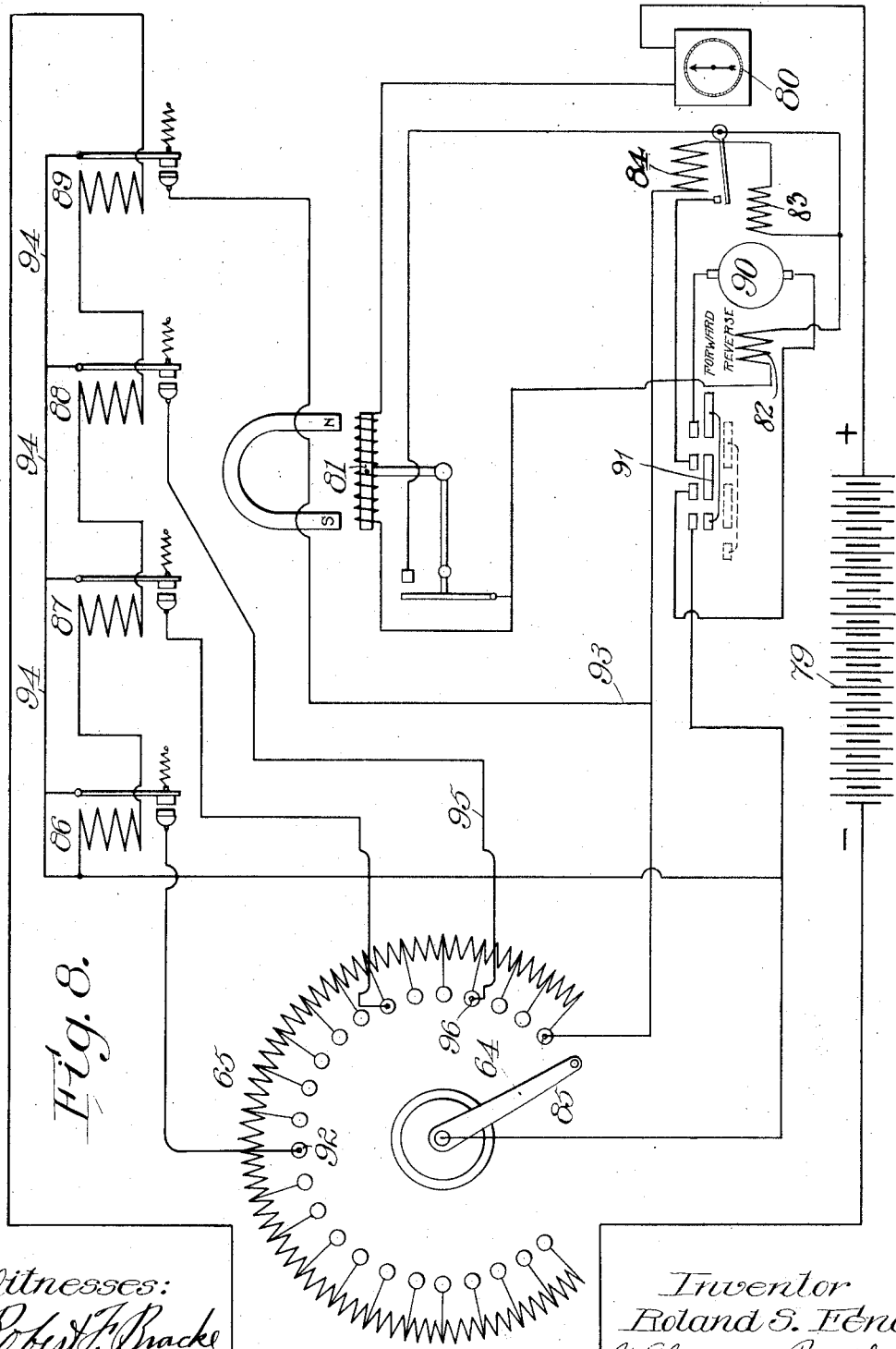

UNITED STATES PATENT OFFICE.

ROLAND S. FEND, OF CHICAGO, ILLINOIS, ASSIGNOR TO WOODS MOTOR VEHICLE COMPANY, OF CHICAGO, ILLINOIS, A CORPORATION OF ILLINOIS.

AUTOMOBILE.

1,255,724.     Specification of Letters Patent.     Patented Feb. 5, 1918.

Application filed May 5, 1915. Serial No. 26,141.

*To all whom it may concern:*

Be it known that I, ROLAND S. FEND, a citizen of the United States, residing at Chicago, in the county of Cook and State of Illinois, have invented certain new and useful Improvements in Automobiles, of which the following is a full, clear, concise, and exact description, reference being had to the accompanying drawings, forming a part of this specification.

My invention relates to motor driven vehicles in which an internal combustion engine and an electric motor and storage battery coöperate to form the prime mover for the vehicle.

Electric vehicles of the class in general use at the present date are provided with storage batteries which are of great weight and require a correspondingly heavy and substantial chassis construction. The principal advantages in these vehicles are their simplicity of operation and of construction made possible by the characteristic of the series motor with which they are universally provided which is such that it is capable of delivering high starting torque and low speed torque by virtue of which no gear changing or ratio changing devices are required between the motor and the driven axle. The principal disadvantages and limitations inherent in the present day electrically driven vehicles are the short life of the storage battery when operated under the conditions which this type of vehicle require, that is, frequent overcharge and overdischarge, and the fact that the touring distance is so limited.

Motor vehicles of the class provided with internal combustion engines as their sole motive power have at the present day reached a high degree of efficiency and simplicity, but, owing to the fact that they produce no torque while the engine shaft is not rotating, and only slight torque at low speeds, this type of vehicle has been universally provided with more or less complicated and expensive gear shifting or ratio shifting devices between the engine and the driving shaft. By reason of the desire, both in electric and gasolene cars, to accelerate rapidly on level roads and to ascend grades at a speed equal to or approaching that which is ordinarily attained on level roads these vehicles are universally provided with power units capable of delivering a great deal more power than that which is necessary for maintaining the speed of the vehicle on level roads. In the gasolene car of the present day this desire for rapid acceleration and high speed hill climbing ability has resulted in large and heavy engines capable of delivering many times the power required of them under ordinary running conditions.

With a full knowledge of the relative advantages and disadvantages of electric and gasolene driven vehicles I have conceived and produced a vehicle which may be termed a gas-electric vehicle and in which many of the advantageous features of both types of vehicles have been united, and from which the principal objectionable features of both types of vehicles have been removed. In carrying out my invention I provide an electric motor of a size capable of starting and satisfactorily accelerating the vehicle and connect the shaft of this motor permanently and in unchangeable gear ratio with the driving axle of the vehicle. I also provide an internal combustion engine which may be coupled directly onto the motor shaft, this engine having less maximum power than that which is available from the electric motor. The arrangement of the parts above described produces a power driven vehicle in which the electric motor and storage battery produce the starting and low speed torque and the excess of power necessary for rapid acceleration and hill climbing, while the internal combustion engine is relied upon for the smaller power necessary for driving the vehicle on level roads and at steady speeds, this internal combustion engine having also a slight excess of power which may be used in charging the storage battery for the demand placed upon it under the abnormal conditions of accelerating and hill climbing, as above pointed out.

One of the objects of my invention is to produce a vehicle which retains the above mentioned advantages inherent in electric vehicles, overcomes the disadvantages thereof as to distance of travel and ease of fuel replenishment, retains these advantageous features of an internal combustion engine driven vehicle and overcomes the necessity of gear shifting devices and excessive engine size inherent in satisfactory present day gasolene cars.

In practice, electric vehicles are operated by unskilled and often careless operators and the batteries are frequently discharged nearly to exhaustion. This causes sulfates to form on the plates which must be removed by overcharge, or often by successive overcharges. Batteries are usually charged by persons who are not familiar with their extent of discharge or misuse, with the result that the life of batteries used on motor vehicles is less than those giving equal output but charged and discharged under more favorable conditions. The vehicle of my invention is so proportioned as to its relative power units that its battery will be charged and discharged within the limits which promote the longest battery life. I have found these proportions to permit the decrease of battery size to substantially one-half that which is at present used while the gasolene power unit, including fuel tank, does not add to the weight of the vehicle as much weight as is released by the decrease in accumulator size. The chassis and other parts of the vehicle may, therefore, be lightened resulting in a large decrease in the gross weight.

The internal combustion engine for the vehicle of my invention is located at the front of the chassis, where the greatest cooling effect may be obtained from air circulation. The crank shaft extends parallel with the lineal axis of the vehicle and carries upon its rear end one member of a magnetic clutch—which acts when desired to first frictionally and then unyieldingly unite the engine shaft with the forward end of the motor shaft.

The rear end of the motor shaft is connected through suitable universal joints—a propeller shaft and worm screw and differential gearing with the sections of the rear axle.

This arrangement of units is desirable because it permits the engine, which by reason of the compression and vacuum created when running with throttle closed—requires considerable power for its rotation, to be uncoupled while the vehicle is being driven by the electric motor alone, it permits the use of the motor armature as fly wheel for the engine—since the engine is never run without the motor.

It permits driving directly through the motor shaft from the engine, thus eliminating bearing, gearing, and line shafting; and it removes the operating units from beneath the floor of the body, thus permitting a lower body construction.

Since the gasolene engine may be rotated at high speed by means of the powerful electric motor, a less complicated engine carbureter may be provided, the usual means for providing a rich mixture for starting being unnecessary.

I preferably utilize a motor which although compounded has its field winding so proportioned that the advantages of high starting and low speed torque and unlimited speed inherent in series motors will be retained, but that other advantages such as are inherent in shunt wound motors may be utilized. The controllers heretofore used for the series motors of electric vehicles have been complicated and expensive devices requiring large current carrying contacts and conductors capable of switching and carrying the entire current of the motor armature. By my present invention I so control the motor circuit that a single automatic switch serves to open and close the armature and series field circuit while the speed and performance of the motor are entirely controlled by introducing varying resistances into the shunt field. The current carried by the shunt field coil is very small and may be switched and controlled by contacts, conductors and resistances which are very inexpensive, practically cannot get out of order, and weigh only a fraction of that of former efficient controllers.

I preferably place the control of the power units under two levers, one arranged to close and vary the resistance of the shunt field circuit of the electric motor, and the other arranged to simultaneously close the clutch circuit which controls the coupling of the gasolene engine to the propeller shaft and the spark circuit of the ignition system, and then by its further movement to open or suitably regulate the gas throttle of the gasolene engine. In the shunt field circuit is a relay winding controlling switch contacts included in the armature and series field circuit. This latter circuit includes the coil of a polarized relay which controls contacts for shunting the series field of the motor when the speed of the motor is high enough that it operates as a generator instead of a motor. The speed at which this will occur is determined by the degree of energization of the shunt field.

The armature circuit serially includes a plurality of marginal relay devices adjusted to attract their armatures under different degrees of energization. These devices control contacts for automatically eliminating resistance from the shunt field when the speed of the motor decreases and the armature current consequently increases. This arrangement automatically provides high field saturation at low armature speeds, thus preventing too great a draft of current from the batteries, the current capacity of which is limited. Another result of this arrangement is that an operator may throw the motor control lever to any position without drawing excessive current from the battery, the four marginal relays being so adjusted that they will all pull up their armatures at the start when high torque and low speed are desired, but will drop off their armatures, one at a time, as the speed of the motor increases and the armature current consequently decreases. In this manner the current in the shunt field circuit is decreased step by step as the armature current is decreased, thus providing an automatic current control for the shunt windings which is something in the nature of that which is inherent in the series winding.

Suitable means are provided for reversing the armature circuit for driving the vehicle backward. The word dynamo is used in the appended claims in its broadest sense, that is, to mean both an electric motor and an electric generator.

My invention is illustrated in the accompanying drawings in which like parts in the several figures are designated by like characters, and in which—

Figure 1 is a front elevation of the combined gas and electric vehicle of my invention.

Fig. 2 is a side elevation of my vehicle in which the disposition of the power plant therein is illustrated by dotted lines.

Fig. 3 is a plan of the chassis and power plant.

Fig. 4 is an elevation of the chassis, parts being removed to show the location of the power plant.

Fig. 5 is the magnetic clutch shown partly in section.

Fig. 6 is a section through the steering column and also shows the circuits of the magnetic clutch and ignition system and the mechanical control therefor and for the arm of the rheostat.

Fig. 8 is a diagrammatic lay-out of the electric motor and storage battery circuits and the controlling mechanism therefor.

Figure 7:
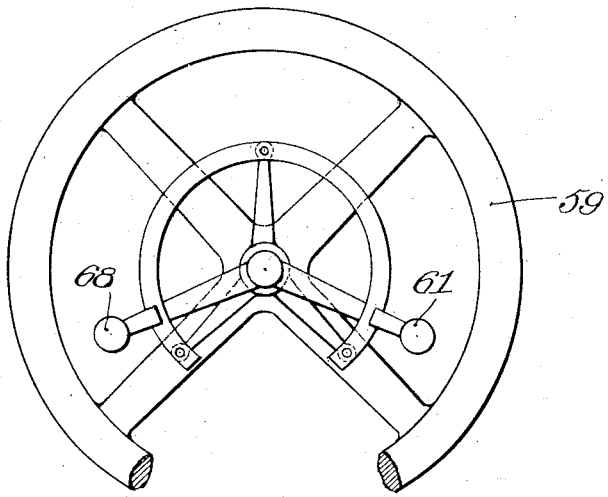
Fig. 7 is a plan of the steering wheel, showing the arrangement of controlling levers thereon.

I have chosen to illustrate my invention as applied to a vehicle of the general semblance of electric vehicles, since it is to this type of vehicles that my invention is preferably applied.

In Fig. 1 a vehicle of the preferred type is provided with a body portion 15 and radiator 16, and with other members such as channels 17, axles 18, springs 19, lamps 20, and well known parts common to the type of vehicles herein illustrated. As shown more clearly in Figs. 2, 3, and 4, mounted under the hood 21 is a gasolene motor 22, preferably provided with four cylinders 23, preferably cast *en bloc* to have lineal space.

The crank case 24 of the engine is flanged at the rear, this flange 25 being bolted to an electric motor shell 26, but spaced therefrom by the apertured spacing ring 27. This unit power structure is mounted in any well known manner, preferably on the so-called three point suspension. The crank shaft of the engine is adapted to be connected to the motor armature shaft by means of a clutch 29 which is shown in detail in Fig. 5.

The clutch illustrated in Fig. 5 comprises two main annuli of magnetic material 32 and 33. The member 32 has an annular channel formed therein in which a coil of fine wire 34 is mounted, the terminals of this coil being led to the slip rings 35 and 36. The coil is maintained in place and protected from grit, or particles of metal, by the non-magnetic washer 37, which may be held in place in any suitable manner such as pricking with a punch. The member 33 is carried upon the hub 39 by means of a flexible steel disk 40, the periphery of which is attached to the member 33 by a plurality of bolts 41 and the inner edge of which is attached to the hub by a plurality of bolts 42. The flexibility of this disk permits the member 33, acting as an armature for the magnetic clutch, to be attracted by the member 32, which forms the yoke of a magnet. When the coil 34 is energized, the magnetic lines encircle the coil and thus thread into and out of the member 33. A ring 44 of friction material, is adjustably mounted around the periphery of the member 32 so as to present an adjustable wearing surface and to keep the armature 33 from coming into actual contact with the magnetic poles of the yoke 32. The member 32 is suitably attached to the end of the engine crank shaft 45 by means of the key 46 and lock nuts 47 and 48, while the hub 39 is suitably attached to the motor shaft 50 by means of a key 51 and pin 52.

The motor shaft is connected through a ball and socket joint 53 directly with the propeller shaft 54, which drives the rear axle 55 by means of a worm gear located within the housing 56. A storage battery 57, preferably divided into two parts and located half at each side of the center line of the car, furnishes the power for the electric motor, or may be charged by the motor when the latter is driven as a dynamo from the gasolene engine, the operation of which will be more fully described hereinafter.

In Fig. 6 is illustrated the steering post mechanism including the circuit controlling devices for the electric motor, clutch and ignition system for the internal combustion engine. This post comprises a steering column 58 to the top of which the wheel 59 is attached, and upon the lower end of which mechanism not herein shown is carried for guiding the front wheels of the vehicle.

Through this hollow column 58 extends a tubular shaft 60 adapted to be revolved by means of the lever 61 and carrying at its lower end the bevel gear 63 to which the movable arm 64 of the rheostat 65 is attached. Extending through this tubular shaft 60 is a second shaft 67 to the upper end of which is attached the lever 68, and carrying at its lower end a bevel gear 69 meshing with a gear 70 carrying wiping contacts 71 and 72 in the circuit of the clutch coil 34, and wiping contacts 73 and 74 in the circuit of the ignition system, represented diagrammatically by the square 75.

The shaft 67 also carries an arm 76 with a rod 77 extending therefrom connecting with the throttle of the gasolene engine in a manner well known and not herein illustrated. This arrangement provides, in a single steering column, means for moving the contact arm 64 of the rheostat 65 to control the electric motor, in a manner to be hereinafter described, through the operation of the lever 61, and means for closing the contacts 71 and 72 of the clutch circuit and contacts 73 and 74 of the ignition circuit, and to thereafter adjust the engine throttle through the movement of the lever 68. The plan view of the steering wheel is shown in Fig. 7 wherein it may be seen that the levers 61 and 68 are capable of revolution only through angles which prevent the levers from conflicting with one another.

The circuit arrangement for the control of the electric motor is diagrammatically shown in Fig. 8, in which the positive pole of the storage battery 79 is shown connected through an ampere hour meter 80, the coil of a polarized relay 81, the low resistance series motor field coils 82, the high resistance shunt motor field coils 83, and the winding of a relay 84 to the first contact 85 of the rheostat 65. The movement of the arm 64 of this rheostat into contact with the point 85 is adapted to complete the circuit of relay 84 through the coils of relays 86, 87, 88, and 89 to the negative pole of battery 79.

When this circuit just traced is closed by the movement of the rheostat arm 64, the high resistance shunt motor coils 83 become energized, the current being such as to saturate the motor field to a comparatively high magnetization. Immediately thereafter the current in this same circuit in passing through the coil of relay 84 causes the contacts of that relay to be closed whereby the circuit of the armature 90 of the electric motor is completed, the current in this circuit passing through the watt hour meter 80, the coil of polarized relay 81, the low resistance series motor field coils 82, contacts of relay 84, armature 90 in one direction or the other depending upon the position of the reversing switch 91, and the coils of relays 86, 87, 88, and 89 back to the negative pole of the battery. The passage of this current through the winding of the polarized relay 81 is in such a direction as to fail to operate that relay to close its associated contacts. The current through the coils of relays 86, 87, 88, and 89 is of sufficient strength to initially actuate those relays, but as the speed of the motor increases and the current through the armature consequently gradually decreases these relays drop away their armatures one at a time, the relay 89 being adjusted by means of its retractile spring so as to release its armature first, the relay 88 second, 87 third, and 86 last. The purpose of these marginal relays, which may be of any number and which may have their contacts tapped in on the contacts of rheostat 65 in any desired spacing, is to give to the high resistance shunt coils 83 an automatic control over the electric motor which is similar to that inherent in the series field of a purely series motor. The operation of these relays under one condition of use will be as follows: Assume that in starting an operator moves the arm 64 immediately into contact with the rheostat button 92, the shunt field coils of the motor will, nevertheless, be saturated to the same extent as though the lever 64 were moved only to its first contact 85 because the relays 86, 87, 88, and 89 will all be actuated whereupon the circuit for the field coils 83 will be completed through conductor 93, the now closed contacts of relay 89, conductor 94, and the coils of relays 86, 87, 88, and 89 to the negative pole of the battery. This circuit contains none of the resistance of the rheostat 65, and contains exactly the same resistance as though the arm 64 were placed upon the first contact 85 of the rheostat. As the motor increases in speed, however, and the current through its armature and through the low resistance coils of the relays 86, 87, 88, and 89 gradually decreases these relays, as heretofore explained, one at a time drop off their armatures, relay 89 being the first to act in this manner. When this occurs the current of the shunt coils 83, which formerly was carried through conductor 93, is caused to pass through three of the resistance windings of the rheostat 65 and then through conductor 95 and the still closed contacts of relay 88, conductor 94 and the coils of relays 86, 87, 88, and 89 to the negative pole of the battery 79. This circuit now including a portion of the rheostat 65 controls the energization of the shunt field coils the same as though the arm 64 were at that time placed upon the button 96 of the rheostat. In a like manner as the motor increases in speed and the current through its armature correspondingly decreases the relays 88, 87, and 86 drop their armatures away in turn bringing into the circuit additional sections of the resistance of the rheostat 65.

When during the operation of the vehicle a hill is encountered, or when in some other manner the speed of the electric motor is reduced without a corresponding movement of the lever arm 64, the relays 86, 87, 88, and 89 act to pull up their armatures in the reverse order from that in which they drop off serving, as the current through the armature of the motor increases, to correspondingly cut resistances from the shunt field circuit thereby increasing the field magnetization due to these shunt windings somewhat in proportion to the increase in armature current.

It is impossible to drive a purely series motor in the direction of its operation as a motor, while its terminals are connected to an external source of current, at a speed sufficiently high that it will be converted into a generator. The reason for this is that the field magnetization decreases with the decrease in armature current caused by the increase of speed so that the counter electro-motive-force never quite reaches the impressed voltage. Since it is one of the purposes of my invention to utilize the motor as a generator for the purpose of charging the storage batteries when the power required to drive the vehicle is less than that which the internal combustion engine supplies, I have provided means whereby I may utilize the shunt coils solely for the field excitation under these conditions. The current generated by the armature in passing through the series field windings would tend to buck down the magnetization of the fields caused by the shunt windings, and it is, therefore, necessary in order that the current delivered from the motor may have a substantial value that the series field coils be eliminated from the circuit during the use of the motor as a generator. It is for this purpose that the coil of the polarized relay 81 is interposed in the battery supply circuit, the adjustment of this relay being such that upon reversal of current in the armature circuit, that is, upon the speed of the motor being brought to a point where the counter electro-motive-force of the armature is greater than that of the storage battery the current will reverse through the winding of relay 81 and that relay will operate to close a low resistance shunt around the series field coils 82.

The ampere hour meter 80 is preferably arranged to compensate for the losses inherent in storage batteries so that whether operating in the direction indicative of current flowing into the battery or operating in the direction indicative of current flowing out of the battery it will at all times indicate substantially the quantity of current stored and available in the storage battery. By careful observance of the indicator of this meter by the operator the battery charge may be maintained within the limits of best battery performance, that is, the battery need never be discharged to a point where the specific gravity of the solution falls below 1200 and need be charged above the point where the specific gravity reaches 1250 only occasionally. If operated between these limits of charge and discharge the depreciation of the storage battery is very slight and the life of the battery will be extended over a period many times that of batteries operated under the severe conditions existing in present day electric vehicle practice.

It will be seen from the foregoing circuit description that by a proper proportion of series and shunt field turns and a proper marginal adjustment of the relays 86, 87, 88, and 89 the electric motor of my vehicle may be satisfactorily controlled by the use of apparatus far simpler and less expensive than that in use for controlling the present day electric vehicles in which the motors are provided only with series field windings. Furthermore, this circuit provides means whereby the motor will be automatically shifted from a motor to a generator upon the attainment of a certain speed pre-determined by the position of the rheostat arm 64, thus making it possible for an operator to either set the throttle of the gasolene motor at a particular position and control the speed of the vehicle by shifting the lever 64 or making it possible for the operator to set the lever 64 at a particular position and control the speed of the vehicle by adjustment of the throttle of the gasolene motor. Of course if further control is desired both gasolene and motor levers may be moved to obtain any desired speed and to divide the power between the gasolene and electric motors in whatever proportions seem advisable to maintain the storage battery at its best condition of charge.

Figure 9:
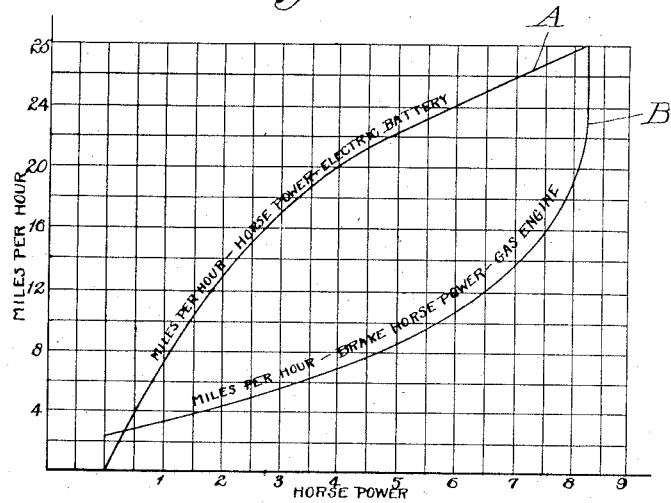
Fig. 9 illustrates the curve of performance of the various units in the power plant for different speeds of the vehicle.

In Fig. 9 I have illustrated curves representing the performance of a vehicle provided with an internal combustion engine capable of giving a maximum of eight and one-quarter horse power.

The curve A in this figure represents the horse power as indicated by the draft on the electric storage battery necessary for driving the car without acceleration on smooth and level roads at all speeds from zero to twenty-five miles per hour. The curve B represents the maximum brake horse power obtainable from the eight and one-quarter horse power gasolene motor with which my vehicle is provided at all speeds up to twenty-five miles per hour.

In order to determine the power available for charging the storage battery carried by the car at any vehicle speed it is only necessary to subtract the actual power required for driving the vehicle from the brake horse power available in the gasolene engine at that speed.

In order to more clearly illustrate the performance let it be assumed that the vehicle is traveling at a speed of sixteen miles per hour. The actual power required is determined by tracing along the sixteen mile ordinate to the point of intersection with the curve A, and then dropping vertically to the base line whereon it may be determined that two and three-fourths horse power are actually required for driving the vehicle at sixteen miles per hour. Tracing farther along the sixteen mile ordinate it may be determined that the gasolene engine is capable of delivering a maximum of seven and one-half horse power at the speed at which it revolves when the vehicle is running at sixteen miles per hour. The difference between seven and one-half horse power (available power from the gasolene engine) and two and three-fourths horse power (that required to drive the vehicle) or four and three-fourths horse power, may be utilized in charging the storage battery.

Of course it is not to be understood that the four and three-fourths horse power referred to is available at the battery terminals, but a definite proportion thereof, dependent upon the efficiency of the electric motor when driven as a generator, is available for charging the storage battery.

From the curve it may be seen at a glance that the gasolene motor alone is capable of driving the vehicle not faster than twenty-five miles per hour, nor is it alone capable of driving the vehicle at a speed lower than two and eight-tenths miles per hour, but at all speeds between two and eight-tenths miles per hour and twenty-five miles per hour it is possible to store energy to be used in starting the vehicle, in hill climbing, in rapidly accelerating, and in driving at speeds above twenty-five miles per hour and below two and eight-tenths miles per hour.

It is not to be understood that the gasolene engine necessarily develops the power indicated by the curve B at the speeds indicated at the left of the chart. The engine is capable of developing any power less than that indicated by the curve B at any speed from one and four-tenths miles per hour up to a speed considerably greater than twenty-five miles per hour. It will thus be seen that the gasolene engine can be made to merely develop the power necessary for driving the vehicle at any desired speed between two and eight-tenths and twenty-five miles per hour without charging the storage battery, or by still further throttling down the gasolene engine it may be made to supply less power than that required for driving the vehicle at any desired speed, the surplus being drawn from the storage battery.

Although it would be possible to utilize a gasolene engine capable of developing considerably less than eight and one-quarter as a maximum horse power if the vehicle were to be continuously operated under the conditions which prevail in the operation of the present day electric vehicles it is my intention that the vehicle of my invention be used under more severe conditions.

The excess of power which I have provided, therefore, in the gasolene engine will permit my vehicle to be used on long tours and on rough and hilly country roads though not at the speed of high powered gasolene touring cars yet at a fuel consumption far less than that required for wholly electric vehicles or wholly gasolene vehicles of the same speed and hill climbing ability.

Although my invention is herein shown and described as applied to a particular type of vehicle, and as including particular circuit and structural details, it is to be understood that these may be varied without departing from the spirit or scope of my invention.

What I claim as new and wish to secure by Letters Patent:

1. A motor vehicle having a driving axle, a compound wound dynamo geared to the driving axle, a battery for supplying current to the dynamo, an internal combustion engine for assisting in driving the vehicle and dynamo, an electro-magnetic switch having its winding in the shunt field circuit and having its contacts in the series field and armature circuits, a variable resistance, and means to include said resistance in the shunt field circuit at will and to thereby control the power input or output of the dynamo at all speeds without changing the external resistance of the dynamo series circuit.

2. A motor vehicle having a driving axle, an internal combustion engine geared to the driving axle in an unchangeable ratio, an electro-magnetic clutch for disconnecting the engine therefrom, together with other power means which acts alone for driving the vehicle at low speeds, a gas throttle for said engine, a lever mechanically connected to said gas throttle and a circuit controlled by said lever for actuating said electro-magnetic clutch.

3. An automobile provided with a dynamo and with an internal combustion engine, a clutch between the dynamo and the engine, a gas throttle for the engine, a manually operable lever mechanically connected with the gas throttle for controlling the speed of the engine, and means controlled in the first movement of said lever in the direction to open the engine throttle for causing the closure of said clutch, the continued movement of said lever in the same direction serving to adjust said throttle and to maintain the closure of said clutch.

4. A motor vehicle having a driving axle, an internal combustion engine, a dynamo connected in driving relation with the driving axle, an electro-magnetic clutch for connecting and disconnecting the engine and dynamo, a gas throttle for said engine, a manually operable and positively adjustable lever mechanically connected to said gas throttle and having a normal position in which the gas throttle is substantially closed, and a circuit for said electro-magnetic clutch controlled by said manually operable lever so as to unite the engine and dynamo when the lever is moved from its normal position and so as to disconnect the engine and dynamo when the lever is returned to its normal position.

5. A motor vehicle and driving means therefor, comprising a dynamo which acts alone for starting the vehicle and for driving it at low speeds and an internal combustion engine of less maximum power than the dynamo, a shunt field for the dynamo and means depending upon the current in the dynamo armature circuit for controlling the energization of the shunt field, together with manually controlled means for varying the shunt field excitation of said dynamo, so that the engine may be caused to act alone or with said dynamo for driving the vehicle at higher speeds.

6. In a motor vehicle the combination with a storage battery, an electric dynamo capable of driving the vehicle, said dynamo having series and shunt field windings, a gasolene engine for driving said dynamo as a generator, a variable resistance in the shunt field circuit only for varying the field excitation of the dynamo to cause it to run either as a motor or generator through wide variations of speed, automatic means operable upon the reversal of current in a path common to both the series and shunt field circuits for shunting the series field windings of said dynamo when the latter is driven as a generator.

7. In combination with a storage battery, of a dynamo having series and shunt field windings, a gasolene engine for driving said dynamo as a generator to charge the storage battery, a variable resistance in series with the shunt field only whereby the dynamo may be caused to run as either a motor or generator through wide variations of speed and automatic means for shunting the series field windings of said motor when the latter is driven as a generator.

8. A motor vehicle provided with a storage battery and a dynamo and with an internal combustion engine, all for driving the vehicle, an electrically operated clutch for connecting the internal combustion engine with the propeller shaft of the vehicle, a throttle for the engine, a throttle lever having mechanical connections with the engine throttle for controlling the speed of the gasolene engine, and a switch also mechanically connected with said lever and closed upon the first movement thereof and maintained closed throughout all of the remainder of the movement of said lever, said switch serving to close the circuit of said electrically operated clutch.

9. For motor vehicles provided with a dynamo and an internal combustion engine, a controller comprising a single lever for starting the dynamo and controlling the speed and power thereof, a second lever for controlling the connection of the dynamo shaft with the shaft of the internal combustion engine, said lever serving in its further movement as the sole power and speed controlling element for the internal combustion engine, said levers being positioned adjacent one another and the devices controlled thereby being so proportioned and adjusted that the performance of the engine and dynamo may be determined by the relative positions of said levers.

10. An automobile provided with a dynamo geared to the driving axle thereof, an internal combustion engine, a gas throttle therefor, a lever mechanically connected with throttle for controlling the speed of the internal combustion engine, an electro-magnetic clutch, the first movement of said lever serving to close the circuit of said electro-magnetic clutch and the continued movement of said lever in the same direction serving to open the said gas throttle to an extent proportionate to the movement of said lever.

11. An automobile provided with a storage battery, and an electric dynamo geared to the rear axle of the automobile, a shunt field for the electric motor, an external resistance in the circuit of said shunt field, an operator's lever for controlling the external resistance, an internal combustion engine, a throttle valve therefor, a power operated clutch for connecting the shaft of said engine with the shaft of said electric dynamo, an operator's lever for controlling the application of power to said power clutch, said lever having a mechanical connection with said throttle valve for controlling the fuel supply to said gasoline engine, whereby said gasoline engine and said dynamo may first be united together through said power clutch and thereafter may be fully controlled by the relative operation of said levers.

12. A motor vehicle having a driving axle, a compound wound dynamo geared to the driving axle, a battery for supplying current to the dynamo, an internal combustion engine for assisting in driving the vehicle and dynamo, a rheostat in the shunt field circuit of the dynamo, an electro-magnetic switch having its coil circuit closed by the first movement of the arm of said rheostat and having its contacts in the series field and armature circuits of the dynamo, the further adjustment of the arm of said rheostat serving to control the power input and output of the dynamo at all vehicle speeds.

13. A motor vehicle having a driving axle, a compound wound dynamo geared to the driving axle, a battery for supplying current to the dynamo, an internal combustion engine for assisting in driving the vehicle and dynamo, an operator's lever, an electro-magnetic switch having its coil circuit closed by the first movement of said operator's lever and having contacts in the series field and armature circuits of said dynamo, the further adjustment of said operator's lever serving to control the current in the dynamo shunt field circuit whereby the power input or output of said dynamo may be controlled at will at all speeds of the vehicle without changing the external resistance of the dynamo series circuit.

14. A motor vehicle having a driving axle, a dynamo therefor geared to the driving axle and having a shunt field circuit, a battery for supplying current to the dynamo, an internal combustion engine for assisting in driving the vehicle and dynamo, an operator's controller, a switch closed in the first movement of said controller, a relay having its winding in circuit with said battery and switch and having contacts in the armature circuit of said dynamo, the further adjustment of said operator's controller serving to vary the current in the dynamo shunt field circuit whereby the power input or output of said dynamo may be controlled at all speeds of the vehicle.

15. A motor vehicle having a driving axle, a dynamo therefor geared to the driving axle and having a shunt field circuit, a battery for supplying current to the dynamo, an internal combustion engine for assisting in driving the vehicle and dynamo, a pair of adjustable members adapted to be manually moved by an operator, a pair of switches, one controlled by each of said members in its first movement from normal, a relay having its coil circuit completed by one of said switches and having contacts in the armature circuit of said dynamo, the further adjustment of the movable member which controls the circuit of said relay serving to adjust the power input and output of said dynamo, an electro-magnetic clutch having its circuit completed by the switch controlled by the other movable member, said clutch serving to unite the shaft of said internal combustion engine with the shaft of said dynamo, the further movement of the latter movable member serving to adjust the power output of said internal combustion engine whereby the relative power output of the engine and power input and output of the dynamo may be varied at different vehicle speeds.

In witness whereof, I hereunto subscribe my name this 3rd day of May, A. D. 1915.

ROLAND S. FEND.

Witnesses:
ROBERT F. BRACKE,
MARY A. COOK.